United States Patent
Kovarik

(10) Patent No.: US 6,815,844 B2
(45) Date of Patent: Nov. 9, 2004

(54) CIRCUIT FOR SUPPLYING POWER TO A NETWORK TERMINATION UNIT OF A MESSAGE TRANSMISSION SYSTEM

(75) Inventor: Peter Kovarik, Vienna (AT)

(73) Assignee: Flextronics International GmbH & Co. Nfg. KG, Kindberg (AT)

( * ) Notice: Subject to any disclaimer, the term of this patent is extended or adjusted under 35 U.S.C. 154(b) by 0 days.

(21) Appl. No.: 10/239,347

(22) PCT Filed: Mar. 22, 2001

(86) PCT No.: PCT/AT01/00084
§ 371 (c)(1),
(2), (4) Date: Dec. 24, 2002

(87) PCT Pub. No.: WO01/72026
PCT Pub. Date: Sep. 27, 2001

(65) Prior Publication Data
US 2003/0102852 A1 Jun. 5, 2003

(30) Foreign Application Priority Data
Mar. 22, 2000 (AT) .......................... 483/2000

(51) Int. Cl.$^7$ ................................ H02J 7/00
(52) U.S. Cl. ............... 307/64; 379/221.03; 379/221.04; 379/323; 379/413
(58) Field of Search ................ 307/23, 44, 45, 307/64, 65; 379/221.03, 221.04, 322, 323, 413, 413.02

(56) References Cited

U.S. PATENT DOCUMENTS 5,289,359 A * 2/1994 Ziermann ................. 363/21.11
5,610,451 A * 3/1997 Symonds ..................... 307/66
6,314,270 B1 * 11/2001 Uchida ...................... 455/67.7
6,504,874 B1 * 1/2003 Timmermann et al. ..... 375/257
6,560,333 B1 * 5/2003 Consiglio et al. ........... 379/413
6,584,197 B1 * 6/2003 Boudreaux et al. .... 379/413.02
6,603,220 B2 * 8/2003 Vergnaud ..................... 307/64
6,665,404 B2 * 12/2003 Cohen ........................ 379/413

FOREIGN PATENT DOCUMENTS

| DE | 197 09 888 C | * | 9/1998 |
| EP | 0 514 171 A1 | * | 11/1992 |
| EP | 0863 654 A | * | 9/1998 |
| JP | 11-89113 A | * | 3/1999 |
| JP | 11-318076 A | * | 11/1999 |

* cited by examiner

Primary Examiner—Adolf Berhane
Assistant Examiner—Gary L. Laxton
(74) Attorney, Agent, or Firm—Henry M. Feiereisen

(57) ABSTRACT

The invention relates to a circuit for supplying power to a network termination unit (55) of a message transmission system, which is connected to a central station via a subscriber line (30). A local power supply voltage source (41), which is arranged in the network termination unit (55) and which supplies power during a normal operating state, is provided as well as a remote power supply source, which is arranged in the central station and which supplies power during an emergency operating state in the case of a failure or malfunctioning of the local power supply voltage source (41). The network termination unit (55) comprises a direct current converter with a transformer and a clocked switch (20). The primary winding (1) of the transformer is connected via the clocked switch (20) to the local power supply voltage source (41), and a connection of the primary winding (1) is connected via a first controllable switch (5) to a wire of the subscriber line (30).

14 Claims, 2 Drawing Sheets

CIRCUIT FOR SUPPLYING POWER TO A NETWORK TERMINATION UNIT OF A MESSAGE TRANSMISSION SYSTEM

BACKGROUND OF THE INVENTION

The invention relates to a circuit for supplying power to a network termination unit of a message transmission system, which is connected to a central station via a subscriber line. A local power supply voltage source, which is arranged in the network termination unit and which supplies power during a normal operating state, is provided as well as a remote power supply source, which is arranged in the central station and which supplies power during an emergency operating state in the case of a failure or malfunctioning of the local power supply voltage source. The network termination unit includes a direct current converter with a transformer and a clocked switch. The primary winding of the transformer is connected via the clocked switch to the local power supply voltage source.

In a service-integrating digital message transmission system (ISDN), the subscriber neighborhood is formed essentially by a network termination unit, an S-interface and subscriber terminals. Power to these terminals is supplied in a normal operating state from the network termination via a local supply voltage and the S-interface. The available power enables operation of the terminals connected to the network termination.

If the local supply voltage, which for safety reasons is typically 24 VDC or 20 VAC, fails or decreases below an acceptable level, then the network termination automatically switches into an emergency operating state, wherein the essential functions of the network termination are maintained by remotely supplied power via a remote supply voltage source arranged at a central location, for example in an exchange. The remote supply voltage is thereby supplied via the subscriber line that exists between the central location and the network termination, wherein only a relatively small amount of power is available in the emergency operating state. The remote supply voltage is typically ±60 VDC.

Such power supplies are mainly used with ISDN systems, but can also be employed with other transmission systems, such as for example ADSL, HDSL, pair-gain systems (PGS) and the like.

The voltage supplied by the local supply power source as well as from the remote supply voltage source is converted by direct current converters to the values required for the various operating states.

To eliminate supply interruptions during switching from the normal to the emergency operating state, conventional current supply circuits have at least two separate direct current converters or a converter with two separate primary circuits which are arranged in such a way that when the local supply fails, the remote supply is available without interruption. For this purpose, two direct current converters or at least two separate primary circuits have to continuously and in parallel supply the output voltage. Each direct current converter or primary circuit, however, requires a separate control and a corresponding separate transformer winding which take up a relatively large space compared to the other components, making miniaturization of the circuit difficult. In addition, using two direct current converters increases the manufacturing costs.

SUMMARY OF THE INVENTION

It is therefore an object of the invention to provide a compact circuit of the aforedescribed type which uses relatively little space and has low manufacturing costs.

This is achieved according to the invention in that a terminal of the primary winding is connected via a first controllable switch with a wire of the subscriber line.

If the local power supply voltage source fails or has insufficient voltage, then the remote supply voltage can be connected via the controllable switch directly with the primary winding of the direct current converter-transformer, so that the remote supply voltage can be converted using one and the same primary circuit, making a second direct current converter unnecessary.

According to another embodiment of the invention, the terminal of the primary winding connected with the first controllable switch can be connected via a second controllable switch with a buffer capacitor.

In this way, the network termination unit can be switched from the normal operating state, in which all terminals are supplied by the network termination, unit into the emergency operating state, in which only the most important operating functions of the network termination unit are maintained, using only a single direct current converter and/or only a single primary circuit and only a single transformer, without encountering a supply bottleneck. The charge stored in the buffer capacitor is thereby capable of supplying to the primary winding of the transformer of the direct current converter the energy necessary to switch into the emergency operating state.

According to another embodiment of the invention, the first and second controllable switch can be formed by field effect transistors, which require only a small control energy.

According to another embodiment of the invention, the buffer capacitor can be connected via a charging branch with a charging voltage source. The buffer capacitor is then continuously charged to compensate for losses in the capacitor.

According to another embodiment of the invention, the charging branch can be formed by a charging resistor which is connected with the subscriber line preferably via a blocking diode.

The charging resistor limits the charging current to the maximum allowable value of the current of the remote supply voltage.

According to another embodiment of the invention, a voltage monitoring unit can be provided whose inputs are connected with the local power supply voltage source, and an output of the voltage monitoring unit can be connected with a unit for controlling the first and second controllable switch.

The voltage monitoring unit monitors the voltage supplied by the local power supply voltage source. If this voltage source fails or the voltage drops below a minimum voltage, a control signal is supplied that controls the second controllable switch, whereby the buffer capacitor is discharged into the primary winding of the transformer. In this way, energy required for switching from the normal operation to the emergency operation is provided during the switch-over time.

According to another feature of the invention, an additional voltage monitoring unit can be provided, whose inputs are connected with the subscriber line, whereby an output of the additional voltage monitoring unit is connected with the unit that controls the first and the second controllable switch.

The additional voltage monitoring unit can continuously monitor the remote supply voltage which is required for transforming the network termination into the emergency operating state.

In a method for switching a network termination unit from the normal operating state into a remotely supplied state by using a circuit according to the invention, it is provided that the amplitude of the local supply voltage is continuously measured and compared with a predetermined minimum value, and that when the predetermined minimum value is underrun, the first controllable switch is closed and the network termination unit is switched from a normal operating state into a remotely supplied state, which preferably represents an emergency operating state.

By closing the first controllable switch, the potential of the remote supply voltage is supplied to the primary winding, which now continues the voltage conversion. Accordingly, the network termination unit is then remotely supplied via the same direct current converter which converts in the normal operating states the local power supply voltage source. If the network termination and the devices connected thereto consume only a small amount of power, then the normal operation can be maintained when switching into the remotely supplied state. Otherwise, the system has to be switched into the emergency operating state.

According to another method for transforming a network termination unit from the normal operating state into the remotely supplied state by using a circuit according to the invention, it is provided that the amplitude of the local supply voltage is continuously measured and compared with a predetermined minimum value, and that when the predetermined minimum value is underrun, the second controllable switch is closed and the network termination unit is switched from a normal operating state into the remotely supplied state, which preferably represents an emergency operating state, wherein during the switch-over time the charge stored in the buffer capacitor is at least partially supplied to the primary winding of the transformer, and that thereafter the first controllable switch is closed.

Discharging the buffer capacitor into the primary winding of the transformer by closing the second controllable switch makes it possible to maintain the supply voltage for the network termination unit during the switch-over into the emergency operating state.

According to another embodiment of the invention, the remote supply voltage can be decreased in the normal operating state to a predetermined value and increased to its full value when the local power supply voltage source fails or has an insufficient voltage or for recharging the buffer capacitor.

In this way, the remote supply voltage can be kept low in the normal operating state and increased only to the required value when needed. This, on the one hand, reduces the energy consumption in the subscriber line due to an excessive remote supply voltage and, on the other hand, reduces the danger associated by a high remote supply voltage.

According to yet another embodiment of the invention, the subscriber line can be forcibly switched into the emergency operating state for maintenance and test purposes and thereafter returned to the normal operating state. In this way, the functionality of the circuit of the invention can be checked.

BRIEF DESCRIPTION OF THE DRAWING

Exemplified embodiments of the invention will be described hereinafter in detail with reference to the drawings. It is shown in FIG. 1 a schematic circuit diagram of the embodiment of the circuit of the invention, and FIG. 2 a schematic circuit diagram of another embodiment of the circuit of the invention.

DESCRIPTION OF PREFERRED EMBODIMENTS

Figure 1:
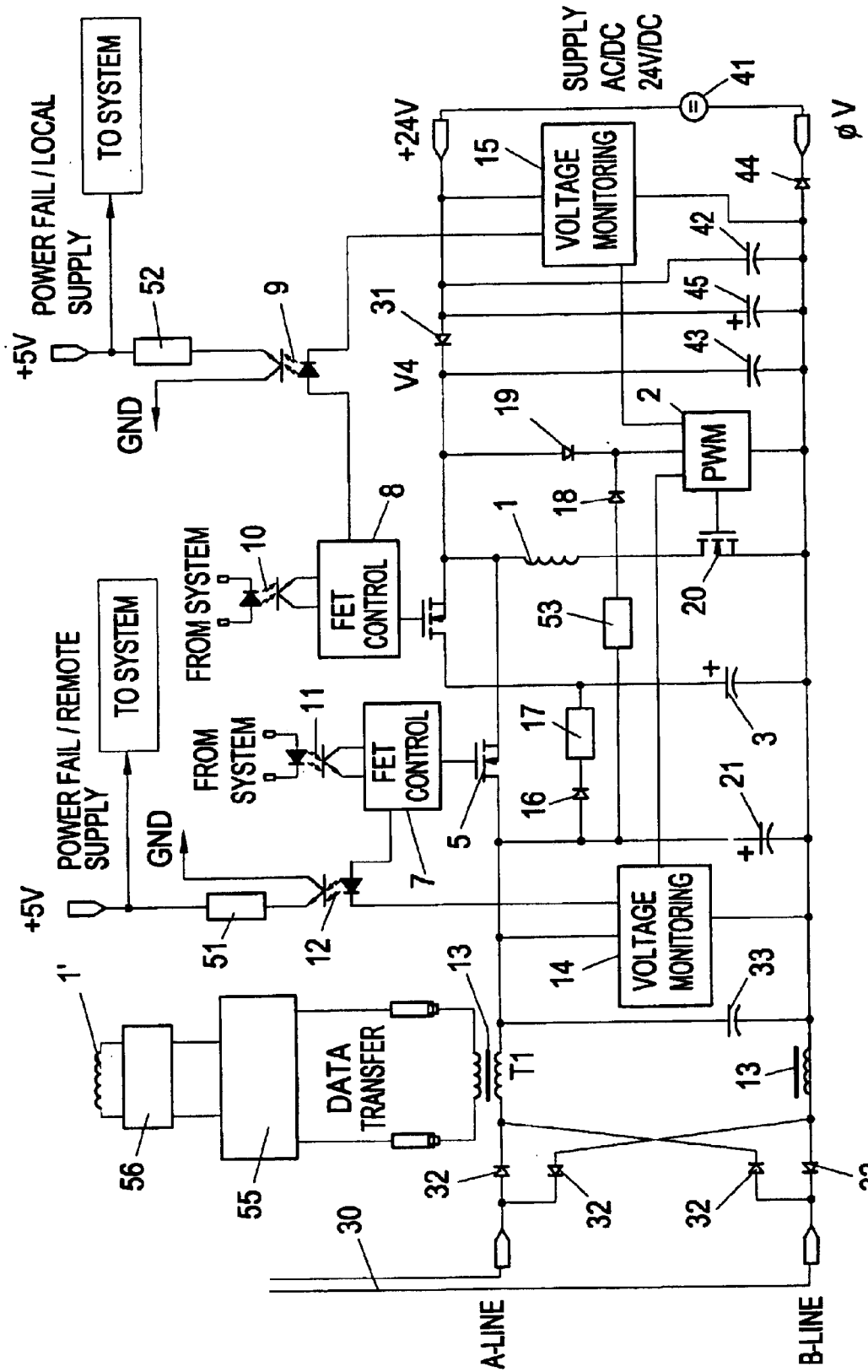

FIG. 1 shows a circuit for supplying power to a network termination unit 55 of a message transmission system which is connected via a subscriber line 30 with a central location of the message transmission system (not shown), for example an exchange. Such circuits are used, for example, in ISDN transmission systems, but can also be used for supplying power in comparable systems, such as for example ADSL, HDSL, PGS and the like.

The network termination unit 55 represents the interface between the data transmission of the subscriber line 30 and subscriber terminals (not shown). The network termination unit 55 is powered via a local power supply voltage source 41, for example a DC or AC power supply, which operates a direct current converter comprised of a transformer, a clocked switch 20 and a clock circuit controlling the clocked switch, for example a pulse width modulator 2. The primary winding 1 of the transformer is connected via the clocked switch 20 with local power supply voltage source 41 whose voltage is chopped by the switch 20, so that on the primary side a series of square pulses is produced. Accordingly, a periodic secondary voltage according to the selected turns ratio of the transformer is generated in the secondary winding 1' which is inductively coupled with the primary winding 1. The secondary voltage is rectified and filtered by a filter and rectifier circuit 56 for supplying to the network termination unit 55.

As long as of the local supply voltage source 41 maintains its voltage, all subscriber terminals can be supplied via the network termination unit 55, which is then in the normal operating state. The data traffic of the network termination unit 55 to the exchange occurs by symmetric feed of the data into the subscriber line by a transformer 13 indicated in FIG. 1. The connection to the subscriber terminals is not shown in FIG. 1 for sake of clarity.

The voltage generated by the supply voltage source can decrease or completely fail for various reasons. If this happens, the network termination unit 55 and all control units and additional units which are required for the emergency operation, switch from the normal operating state into the emergency operating state wherein only the most important operating functions are maintained. Power is then supplied by the remote supply voltage source located at the exchange.

To ensure a smooth transition from the local supply to the remote supply, it is provided according to the invention that a terminal of the primary winding 1 is connected via a second controllable switch 4 with a buffer capacitor 3 and via a first controllable switch 5 with a wire of the subscriber line.

In the normal operating state, the amplitude of the local supply voltage is continuously measured and compared with a predetermined minimal value. According to the embodiment of the invention depicted in FIG. 1, the supply voltage in the normal operating state is, for example, 24 VDC or 24 VAC, with an exemplary power consumption of approximately 9 W. The remote supply voltage is, for example, set to ±60 V. Other values for the voltage or power can be selected.

If the voltage decreases below a predetermined minimal value, e.g., 21.5 VDC, then the second controllable switch 4 is closed and the network termination unit 55 as well as the control (not shown) are switched from a normal operating state into an emergency operating state. Thereafter, the first controllable switch 5 is closed, whereby the remote supply voltage is applied to the primary winding 1, which is then chopped by the clocked switch 20 and transmitted into the secondary winding 1', thereby maintaining the emergency operating state via the remote supply voltage.

In the normal operating state, the primary winding 1 of the direct current converter-transformer converts the voltage of the local power supply voltage source 41, with the primary winding 1 converting the remote supply voltage after the switch-over. In this way, only a single transformer and a single primary circuit are required for the direct current conversion, which saves considerable space for the circuit of the invention.

When the second controllable switch 4 is closed, the charge stored in the buffer capacitor 3 is applied to the primary winding 1 so as to maintain the direct current conversion for a short period of time to enable switch-over into the emergency operating state. Thereafter, the total remote supply voltage is applied via the first switch 5 to the primary winding, without interruption in the supplied power.

The two controllable switches 4, 5 as well as the controllable switch 20 are implemented in FIG. 1 as FET transistors, but can also be implemented as other forms of conventional controllable switching elements.

For detecting a failure of the supply voltage source 41, a voltage monitoring unit 15, which is implemented for example as a comparator circuit, is provided, whose inputs are connected with the local power supply voltage source 41. The output of the voltage monitoring unit 15 is connected with a unit for controlling the first and second controllable switch 5, 4, with the unit being shown in FIG. 1 as two separate control units 7, 8.

The buffer capacitor 3 is connected with the subscriber line 30 via a charging resistor 17 and a blocking diode 68. The capacitor 3 can also be charged without the charging resistor 17, which is necessary only if the storage capacity of a buffer capacitor 3 is very large or the charging voltage, in the illustrated case the remote supply voltage, is only capable of charging capacitors up to a certain maximum capacitance. The buffer capacitor 3 can also be charged using another voltage source. The value of the charging resistor 17 depends on the remote supply voltage and the maximum remote supply current available for charging the capacitor 3.

In order to monitor the remote supply voltage, an additional voltage monitoring circuit 14 is provided, whose inputs are connected with the subscriber line 30, wherein an output of the additional voltage monitoring unit 14 is connected with a unit for controlling the first and second controllable switches 5, 4.

As long as the local power supply voltage source 41 supplies a sufficiently large supply voltage, the remote supply voltage is applied to the series connection of charging resistor 17 and buffer capacitor 3 via the subscriber line 30, with the buffer capacitor 3 maintained in a charged state via the charging resistor 17.

When the local supply voltage falls below a predetermined minimal value, then the voltage monitoring unit 15 controls an optocoupler 9, causing the potential on a resistor 52 to change, which is communicated to a control system (not shown) as an error signal. The control system controls an optocoupler 10, which closes via a switch control unit 8 the second controllable switch 4, whereby the buffer capacitor 3 is discharged via the primary winding 1, maintaining the current conversion for a short time, if the voltage monitoring unit 14 detects a specified remote supply voltage on the subscriber line 30. The remote supply voltage then generates via an optocoupler 12 a control signal on a resistor 51 which is supplied to the control system (not shown). After the discharge time of the buffer capacitor 3, the control system controls an optocoupler 11, which closes via an additional switch control unit 7 the first controllable switch 5 and thereby applies the remote supply voltage to the primary winding 1. The additional switch control unit 7 can also be controlled directly via the optocoupler 12 so as to close the first controllable switch 5.

According to another embodiment of the circuit, the optocoupler 9 can also directly control the switch control unit 8 which affects the switch position of the second controllable switch 4.

As long as neither the local supply voltage nor the remote supply voltage reach the required value, the control system is reset to an initial state.

The other switch components depicted in FIG. 1 are of lesser importance. For example, the bridge rectifier 32 makes the system independent of the polarity, whereas capacitors 21, 33, 42, 43 and 45 operate as termination and filter capacitors.

Diode 31 operates as a blocking diode with respect to the remote supply voltage. The supply input of the pulse width modulator 2 is also protected by blocking diodes 18, 19. The pulse width modulator 2 is supplied during the startup phase via the remote supply voltage and diode 18, whereby a limiting resistor 52 limits the remote supply current to a maximum allowable value. During the normal operation, the pulse width modulator 2 is powered via the diode 19 or via a specially provided winding of the transformer (not shown).

When the switch of the invention is first turned on, the process flow is as follows:

1) Start-Up with Available Local Supply

Initially, the voltage monitoring unit 15 indicates that a local supply voltage is present, whereafter the pulse width modulator 2 is started. After the voltage is built up, the control system is activated. The buffer capacitor 3 is charged via the remote supply voltage that is present on the subscriber line 30. When the local supply voltage fails or has an insufficient voltage, the second controllable switch 4 is closed and the operation is switched to the emergency operating state. When the switch-over is complete after, for example, 10 to 20 milliseconds, the first controllable switch 5 is closed and the remote supply voltage is applied to the primary winding 1. As soon as a local supply voltage is again available with full amplitude, the first controllable switch 5 is opened first, whereafter the second controllable switch 4 is opened.

2) Start-Up with Unavailable Local Supply

Initially, the voltage monitoring unit 15 indicates that the remote supply voltage is present. Because the local supply voltage is not available, the control system switches into the emergency operating mode. The buffer capacitor 3 is discharged via the charging resistor 17. If a defined remote supply voltage is present, then the first controllable switch 5 is closed and the supply voltage is applied to the primary winding 1.

If the voltage of the remote supply voltage can be altered, then it becomes possible to lower the remote supply voltage in the normal operating state to a predetermined value and to increase the remote supply voltage to its full value only when the local power supply voltage source fails or has an insufficient voltage or for recharging the buffer capacitor 3.

Because the remote supply voltage increases relatively slowly, the buffer capacitor 3 has to be dimensioned so that the required time is included in the discharge time of the buffer capacitor 3.

In addition, the invention also includes an embodiment without a buffer capacitor 3. In this embodiment, the second controllable switch 4 is eliminated and only one terminal of the primary winding is connected to a wire of the subscriber line 30 via the first controllable switch 5. In the normal operating state, the amplitude of the local supply voltage is continuously monitored and compared with a predetermined minimum value. When the predetermined minimum value is underrun, the first controllable switch 5 is closed and the network termination unit is switched from the normal operating state into the emergency operating state.

Switchback from the Emergency Operating State to Normal Operating State

When the full supply voltage returns, the voltage monitoring unit 15 reports this to the control system, causing the first controllable switch 5 and, if necessary, also the second controlled both switch 4 to be switched off. Both switches 4, 5 have to be open for the current supply to switch from the emergency operating mode to the normal operating mode.

The subscriber line 30 is forcibly switched into the emergency operating state for maintenance and test operations. For this purpose, an additional controllable switch (not shown in FIG. 1) can be provided for interrupting the local supply voltage.

Figure 2:
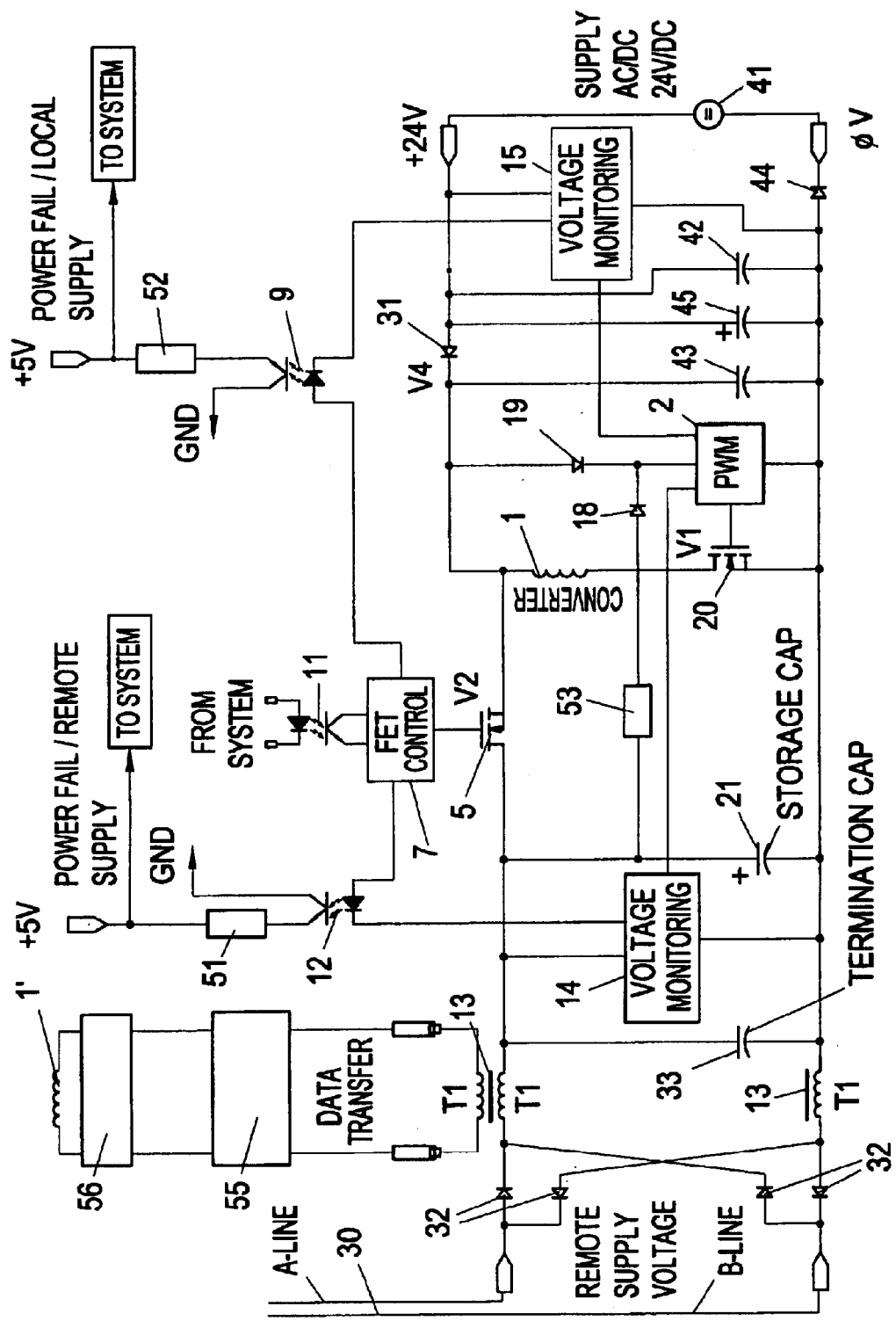

In the embodiment of FIG. 2, the power consumption of the network termination unit and of all pertaining units is so small that full power can be supplied from both the local supply voltage 41 and the remote supply voltage. One terminal of the primary winding 1 is hereby connected via the first controllable switch 5 with a wire of the subscriber line 30. The system can operate in the following two ways:

1) Powered via the Local Supply

The voltage monitoring units 14 and 15 monitor the remote supply voltage and the local supply voltage. If the local supply voltage source 41 fails or has an insufficient voltage, then the first switch 5 is closed when a sufficient remote supply voltage is detected, and the remote supply voltage is smoothly switched to the primary winding 1. A buffer capacitor 3 is therefore not required. As soon as the full local supply voltage is available, the voltage monitoring unit 15 reports this to the control system, causing the first controllable switch 5 to be switched off.

2) Powered via the Remote Supply Voltage

If a local supply voltage is not present, then the first controllable switch 5 is closed, and the remote supply voltage is switched to the primary winding 1. The voltage monitoring unit 14 continuously checks if a sufficiently large remote supply voltage is present on the subscriber line 30. If the local power supply voltage source 41 is to be connected at full voltage, then the voltage monitoring unit 15 reports this to the control system, causing the first controllable switch 5 to be switched off. The operation then continuous via the local power supply.

What is claimed is:

1. A circuit for supplying power to a network termination unit of a message transmission system, which is connected to a central station via a subscriber line, said central station including a remote power supply source that supplies power during an emergency operating state, the network termination unit comprising:

a local power supply voltage source that supplies power during a normal operating state, a direct current converter with a transformer having a clocked switch and a primary winding, which is connected via the clocked switch to the local power supply voltage source, and a first controllable switch, wherein a terminal of the primary winding is connected via the first controllable switch to a wire of the subscriber line.

2. The circuit of claim 1, and further comprising a second controllable switch and a buffer capacitor, wherein the terminal of the primary winding that is connected with the first controllable switch is also connected via the second controllable switch with the buffer capacitor.

3. The circuit of claim 2, wherein the first and second controllable switch are formed by field effect transistors.

4. The circuit of claim 2, and further including a charging branch, wherein the buffer capacitor is connected via the charging branch with a charging voltage source.

5. This circuit of claim 4, wherein the charging branch is formed by a charging resistor which is connected with the subscriber line.

6. This circuit of claim 5, and further comprising a blocking diode connected between the charging resistor and the subscriber line.

7. The circuit of claim 2, and further comprising a first voltage monitoring unit having an input and an output, and a control unit, wherein the input of the first voltage monitoring unit is connected with the local power supply voltage source and the output of the first voltage monitoring unit is connected with the control unit for controlling the first and second controllable switch.

8. The circuit of claim 7, and further comprising a second voltage monitoring unit having an input and an output, wherein the input of the second voltage monitoring unit is connected with the subscriber line, and the output of the second voltage monitoring unit is connected with the control unit that controls the first and the second controllable switch.

9. A method for switching a network termination unit from a normal operating state to a remotely supplied state by using the circuit of claim 1, comprising the steps of:

measuring the amplitude of a local supply voltage and comparing the local supply voltage with a predetermined minimum value, and closing the first controllable switch when the local supply voltage is smaller than the predetermined minimum value, thereby switching the network termination unit from the normal operating state to the remotely supplied state.

10. A method for switching a network termination unit from a normal operating state to a remotely supplied state by using the switching circuit of claim 2, comprising the steps of:

measuring the amplitude of a local supply voltage and comparing the local supply voltage with a predetermined minimum value, closing the second controllable switch when the local supply voltage is smaller than the predetermined minimum value, thereby switching the network termination unit from the normal operating state to the remotely supplied state, wherein during the switching of the network termination a charge stored in the buffer capacitor is at least partially supplied to the primary winding of the transformer, and closing the first controllable switch.

11. The method of claim 9, and further comprising the steps of decreasing the remote supply voltage in the normal operating state from a full value to a predetermined remote value, and increasing the remote supply voltage to the full value when the local supply voltage falls below a predetermined local value or for recharging the buffer capacitor.

12. The method of claim 10, and further comprising the steps of decreasing the remote supply voltage in the normal operating state from a full value to a predetermined remote value, and increasing the remote supply voltage to the full value when the local supply voltage falls below a predetermined local value or for recharging the buffer capacitor.

13. The method of claim 9, and further comprising the step of switching the subscriber line into the remotely supplied state for maintenance and test work and returning the subscriber line to the normal operating state after the maintenance and test work has been concluded.

14. The method of claim 10, and further including switching the subscriber line into the remotely supplied state for maintenance and test work and returning the subscriber line to the normal operating state after the maintenance and test work has been concluded.

* * * * *